US012004481B2

(12) United States Patent
Ross

(10) Patent No.: US 12,004,481 B2
(45) Date of Patent: Jun. 11, 2024

(54) HANDS FREE PET CARRIER SYSTEM

(71) Applicant: The Fundamentum Holding Company LLC, Bridgeport, CT (US)

(72) Inventor: Brandon Ross, Bridgeport, CT (US)

(73) Assignee: The Fundamentum Holding Company LLC, Bridgeport, CT (US)

( * ) Notice: Subject to any disclaimer, the term of this patent is extended or adjusted under 35 U.S.C. 154(b) by 192 days.

(21) Appl. No.: 17/374,793

(22) Filed: Jul. 13, 2021

(65) Prior Publication Data
US 2022/0015328 A1    Jan. 20, 2022

Related U.S. Application Data

(60) Provisional application No. 63/103,011, filed on Jul. 14, 2020.

(51) Int. Cl.
  *A01K 1/02*    (2006.01)
  *A45F 3/04*    (2006.01)
  *A45F 3/00*    (2006.01)

(52) U.S. Cl.
  CPC ............ *A01K 1/029* (2013.01); *A01K 1/0254* (2013.01); *A01K 1/0272* (2013.01); *A45F 3/04* (2013.01); *A45F 2003/003* (2013.01)

(58) Field of Classification Search
  CPC .... A01K 1/029; A01K 1/0254; A01K 1/0272; A01K 1/0236; A45F 3/04; A47D 13/025
  USPC ..................................... 119/497; 446/26, 28
  See application file for complete search history.

(56) References Cited

U.S. PATENT DOCUMENTS

| | | | | |
|---|---|---|---|---|
| 23,979 | A | * | 5/1859 | Griffiths .............. F41C 33/0209 224/231 |
| 2,969,767 | A | * | 1/1961 | Bassett ................ A01K 1/0254 119/497 |
| 3,850,144 | A | * | 11/1974 | Springer .............. A01K 1/0254 119/497 |
| 4,324,204 | A | * | 4/1982 | Friedman ............. A01K 1/0272 280/801.1 |
| 4,597,359 | A | * | 7/1986 | Moorman ............ A01K 27/002 119/28.5 |
| 4,600,134 | A | * | 7/1986 | Colby ....................... A45F 3/14 224/264 |

(Continued)

FOREIGN PATENT DOCUMENTS

| | | | | |
|---|---|---|---|---|
| DE | 20016439 U1 | * | 2/2001 | ............. A45C 15/00 |
| DE | 20200924 U1 | * | 4/2002 | ............. A45C 15/06 |

(Continued)

OTHER PUBLICATIONS

Tapia-Picazo et al. "Polyester Fiber Production Using Virgin and Recycled PET" published in Fibers and Polymers 2014. vol. 15, No. 3, 547-552 (Year: 2014).*

(Continued)

*Primary Examiner* — Morgan T Jordan
(74) *Attorney, Agent, or Firm* — Wiggin and Dana LLP

(57) ABSTRACT

A wearable multifunctional hands free pet carrier system seamlessly combines features of an adjustable bag for carrying a pet, with petting pockets, an in-vehicle restraint system, and a retractable leash. The petting pockets allow the user to touch and pet the animal directly while using the pet carrier system, thereby fostering bonds of attachment between pet owner and pet.

18 Claims, 17 Drawing Sheets

(56) References Cited

U.S. PATENT DOCUMENTS

| | | | | |
|---|---|---|---|---|
| 4,648,121 A * | 3/1987 | Lowe | A45F 3/04 | 224/651 |
| 4,977,857 A * | 12/1990 | Slawinski | A01K 1/0254 | 119/497 |
| 4,984,535 A * | 1/1991 | White | A01K 1/0245 | 119/453 |
| 5,005,526 A * | 4/1991 | Parker | A01K 1/0272 | 119/751 |
| 5,170,745 A * | 12/1992 | Burdette, Jr. | A01K 1/0254 | 119/497 |
| 5,176,102 A * | 1/1993 | Tracy | A01K 1/029 | 224/648 |
| 5,240,159 A * | 8/1993 | Gregory | A45F 3/04 | 224/264 |
| 5,277,148 A * | 1/1994 | Rossignol | A01K 1/0245 | 119/497 |
| D344,372 S * | 2/1994 | Maddix | A01K 1/0272 | D34/1 |
| 5,419,281 A * | 5/1995 | Williams | A47D 13/027 | 224/159 |
| 5,634,576 A * | 6/1997 | Arbel | A45C 5/14 | 224/652 |
| 5,988,879 A * | 11/1999 | Bredderman | B65D 81/3888 | 383/110 |
| 6,082,305 A * | 7/2000 | Burns | A01K 1/0254 | 119/497 |
| 6,286,461 B1 * | 9/2001 | Martz | A01K 1/0254 | 119/497 |
| 6,481,606 B2 * | 11/2002 | Pickett | A01K 1/0254 | 224/640 |
| 6,701,871 B1 * | 3/2004 | Johnson | A01K 1/0254 | 119/500 |
| 9,101,199 B1 * | 8/2015 | Harry | A01K 1/029 | |
| 9,198,525 B2 | 12/2015 | Wernick | | |
| 9,737,122 B1 * | 8/2017 | Ives | A45F 3/04 | |
| 10,045,634 B2 * | 8/2018 | Salazar | A47D 13/025 | |
| D909,049 S * | 2/2021 | Watson | D30/151 | |
| 10,939,744 B2 * | 3/2021 | Robinson | A47D 13/025 | |
| 10,945,518 B1 * | 3/2021 | Lutin | A45F 4/02 | |
| D915,762 S * | 4/2021 | Li | D3/217 | |
| 10,986,911 B2 * | 4/2021 | Cotirla | A45F 3/04 | |
| 11,206,807 B1 * | 12/2021 | Sturiale | A01K 1/029 | |
| 11,470,931 B2 * | 10/2022 | Davis | A45F 4/02 | |
| 11,490,741 B1 * | 11/2022 | Pa | A47D 13/025 | |
| 11,540,487 B2 * | 1/2023 | Watson | A45F 3/04 | |
| 2002/0074372 A1 * | 6/2002 | Pickett | A01K 1/0254 | 224/576 |
| 2003/0127060 A1 * | 7/2003 | Yeung | A01K 1/0254 | 119/497 |
| 2003/0145801 A1 * | 8/2003 | DeBien | A01K 27/005 | 119/772 |
| 2004/0031827 A1 * | 2/2004 | Haber | A45F 3/04 | 224/160 |
| 2005/0077329 A1 * | 4/2005 | Sconzo | A45F 3/04 | 224/153 |
| 2006/0213452 A1 * | 9/2006 | King | A01K 1/0245 | 119/496 |
| 2008/0149673 A1 * | 6/2008 | Slater | A01K 1/0254 | 224/153 |
| 2010/0000472 A1 * | 1/2010 | Siklosi | A01K 1/0272 | 119/497 |
| 2011/0180575 A1 * | 7/2011 | Abramowitz | A45F 3/04 | 224/259 |
| 2012/0262116 A1 * | 10/2012 | Ferber | H02J 7/0044 | 429/163 |
| 2012/0262117 A1 * | 10/2012 | Ferber | H02J 7/0048 | 320/111 |
| 2013/0026204 A1 * | 1/2013 | Abramowitz | A45C 13/03 | 224/613 |
| 2013/0177264 A1 * | 7/2013 | Utterback | D02G 3/04 | 57/58.54 |
| 2013/0220231 A1 * | 8/2013 | Hovsepian | B62J 9/24 | 119/496 |
| 2014/0060453 A1 * | 3/2014 | Shewfelt | A01K 27/002 | 119/770 |
| 2014/0230748 A1 * | 8/2014 | Renforth | A01K 1/0254 | 119/496 |
| 2014/0274204 A1 * | 9/2014 | Williams | H04B 1/385 | 455/556.1 |
| 2015/0201761 A1 * | 7/2015 | Wollenberg | A45F 4/02 | 224/160 |
| 2017/0172102 A1 * | 6/2017 | Rivera | A45F 3/04 | |
| 2017/0360025 A1 * | 12/2017 | Skryplonek | A01M 29/30 | |
| 2018/0139921 A1 * | 5/2018 | Kath | A01K 1/029 | |
| 2018/0139922 A1 * | 5/2018 | Watson | A01K 1/0254 | |
| 2019/0124882 A1 * | 5/2019 | Hazouri-Yeary | A45C 7/0063 | |
| 2019/0289813 A1 * | 9/2019 | Hayashi | A01K 1/0254 | |
| 2021/0093098 A1 | 4/2021 | Ross | | |

FOREIGN PATENT DOCUMENTS

| | | | | |
|---|---|---|---|---|
| EP | 1044602 A1 * | 10/2000 | | A01K 1/0254 |
| FR | 2590458 A1 * | 11/1985 | | A01K 1/0254 |
| FR | 2794620 A1 * | 12/2000 | | A01K 1/0254 |
| GB | 2339132 A * | 1/2000 | | A01K 1/0254 |
| JP | H04106960 U * | 9/1992 | | A01K 1/0254 |
| WO | WO-0179069 A1 * | 10/2001 | | A01K 1/0254 |
| WO | WO-2012066289 A2 * | 5/2012 | | A45F 3/04 |

OTHER PUBLICATIONS

"Polyethylene terephthalate" Wikipedia (Year: 2023).*

"Alcoa KAMA 4200 RPET" MatWeb https://www.matweb.com/search/datasheet.aspx?matguid=ccca9a2847f94a19b0a6fed8a5880d48 (Year: 2024).*

* cited by examiner

HANDS FREE PET CARRIER SYSTEM

BACKGROUND/SUMMARY

CROSS-REFERENCE TO RELATED APPLICATIONS

In accordance with 35 U.S. Code § 119, this application claims priority to inventor's U.S. Provisional Patent Application Ser. No. 63/103,011, filed Jul. 14, 2020, which is herein incorporated by reference in its entirety.

FIELD OF THE DISCLOSURE

The present invention generally relates to wearable pet carrier systems. More specifically, the present invention relates to a lightweight wearable pet carrier system equipped with a hands-free retractable leash that is secured in particular but not limited to the inside back section of the pet carrier or that is removable, petting pockets that are located but not limited to the sides of the pet carrier, and that is also capable of mounting securely inside a vehicle for use as a vehicle restraint system for a pet.

BACKGROUND TO THE DISCLOSURE

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the herein disclosed claimed technology.

Pets are often kept indoors for many hours a day and benefit from time spent accompanying their caregiver or pet owner on outdoor excursions. Moreover, the bonds of attachment fostered during such excursions provide an additional mutual benefit to pets and their owners. Some pets may become anxious during travel, and a wearable carrier is well suited for providing comfort to soothe the animal and relieve anxiety. Additionally, wearable pet carriers are especially convenient in urban settings or high-rise buildings where it may be dangerous for the pet to roam about, in cases of inclement weather (ice, snow, rain, or extreme temperature), and for older pets that may have trouble walking. Early of examples of wearable pet carriers, such as that disclosed in U.S. Pat. No. 5,277,148, "Wearable Pet Enclosure" by Rossignal et al. were bulky, uncomfortable to wear, did not facilitate contact between the owner and the pet. There is a need for a close-fitting comfortable wearable pet carrier that fosters bonding between the owner and the pet. Another example is disclosed in U.S. Pat. No. 9,198,525, "Wearable Carrier and Method of Carrying a Child or Animal" by Wernick et al. but this disclosure fails to provide for any sort of restraint to prevent the pet from escaping.

Pet owners are increasingly travelling with their pets by car or other vehicle, whether on trips to the vet, to destinations such as the park or beach, or simply for companionship while the owner runs errands around town. While travelling in a vehicle, an unrestrained pet may be a potential source of distraction to the vehicle driver. Or in case of an accident, an unrestrained pet may become injured or may cause injury to other occupants of the vehicle. Indeed, in recognition of this danger, several states have enacted laws requiring that animals be restrained while traveling in a vehicle.

A pet usually travels with at least some type of accessories, typically a leash and some food, and the owner may also carry his or her own accessories such a mobile devices, external batteries for those devices, ear pods, etc. If the pet will be transported by car, for example, a vehicle restraint system will be needed. As prices for pet products in general increase, users will seek ways to reduce expenditure on individual, one-type-use products and instead will seek out products that effectively combine features of these individual products into one multifunction product. At the same time, users will want such products to be simple and easy to use in a variety of pet product need scenarios. Specifically, and as an example, pet carriers, backpacks, retractable leashes, mobile device chargers, waterproof liners, and car restraints have heretofore not been designed to be combined as one product. In general, multipurpose and multifunctional products have enjoyed increased popularity over the last few years, but there has been a lack of technological innovation that addresses the market's demand for multifunctional and multipurposed pet products.

As prices for pet products in general increase, users will seek ways to reduce expenditure on individual, one-type-use products and instead will seek out products that effectively combine features of these individual products into one multifunction product. At the same time, users will want such products to be simple and easy to use in a variety of pet product need scenarios. Specifically, and as an example, pet carriers, backpacks, retractable leashes, mobile device chargers, and car restraints have heretofore not been designed to be combined as one product. As a consequence, prior to embarking on a walk with their pet, the individual pet owner is left to struggle with gathering the necessary items, e.g., a pet carrier, a backpack stocked with food and/or other provisions, a leash, a mobile device and external charging battery, and a vehicle restraint system, and then not only transporting both pet and needed pet items but also with walking their pet hands-free.

Accordingly, there remains a need for a wearable pet carrier that combines the functionality of a pet carrier with a backpack and vehicle restraint system into one seamless system.

BRIEF DESCRIPTION AND SUMMARY OF THE EMBODIMENTS

In view of the aforementioned disadvantages of conventional pet carrier systems, an object of the invention is to combine the functionality of a separate pet carrier and backpack into one seamless system. To soothe the pet and foster a bond of attachment between the pet and its owner, the system is provided with petting pockets. The term petting pocket as used herein refers to "pockets" through which the user may insert their hands inside the carrier to touch directly, rub, and pet their animal. In some embodiments the pet carrier may be equipped with a built-in retractable hands-free leash that is removable. The pet carrier system may include straps (e.g., made from nylon) configured with the clips to afford adjustment of the pet carrier on a user.

In an aspect of the present disclosure, a restraining strap is provided that allows the user to secure their pet inside the carrier without worry of the pet jumping out and running away but also the ability to simply unzip part of the carrier and allow the pet to get out while still being attached to the carrier hands-free without having to hold a leash. There will be a detachable retractable leash option allowing the user to hold the leash in hand or wrist. In some embodiments, a detachable retractable leash may alternatively be secured to an exterior portion of the carrier having a receiving member or clip, for example to the lumbar support strap surrounding the waist of the user, such that the user can have an alternative option for hands-free operation.

In another aspect of the present disclosure, the petting pockets are located on the side of the carrier to allow the user rub and touch their pet. The petting pockets can be opened and closed by any appropriate securing or fastening means, including zipper, button, magnetic closures, or hook-and-loop type fasteners.

In certain embodiments a hands free pet carrier system according to the present disclosure may include a bag defining a cavity therein configured for receiving a pet, the bag provided with a releasably attachable top cover having an orifice of adjustable diameter through which the pet may protrude its head; a left shoulder strap and a right shoulder strap, each shoulder strap having a first end attached at an upper portion of the bag and a second end provided with a fastener that releasably attaches to a corresponding mating fastener attached at a lower portion of the bag; a stabilizing strap that releasably connects both shoulder straps at a mid-point thereof; an adjustable lumbar support strap attached on a lower portion of the bag; a petting pocket provided on a side of the bag, the petting pocket having an orifice through which a user may insert a hand or finger and directly touch the pet within the bag; and a safety leash having a first end attached to an interior surface of the bag cavity and a second end provided with a fastener configured to attach to a collar worn by the pet.

In other embodiments, the hands free pet carrier system according to the present disclosure may additionally include a ventilation port provided on the bag at a side opposite the shoulder straps, the ventilation port configured to permit air to flow therethrough and is provided with a releasably attachable cover.

In still other embodiments, the hands free pet carrier system according to the present disclosure may additionally include a seat loop provided on a same side of the bag as the shoulder straps, the seat loop adapted to receive a vehicle seatbelt threaded therethrough. The pet carrier may be secured to a seat in a vehicle by placing the pet carrier in the vehicle seat; threading a vehicle seatbelt through the seat loop and fastening the free end of the seatbelt to its corresponding seatbelt buckle; threading the shoulder straps between left and right posts of a headrest disposed at the top of a vehicle seat so that the shoulder straps extend to the rear of the vehicle seat; attaching a fastener at the free end of each shoulder strap at the rear of the vehicle seat to a corresponding mating fastener secured to the bag; connecting the shoulder straps to one another via the stabilizing strap at the rear of the seat; wrapping the lumbar support strap around the rear and sides of the vehicle seat and connecting the lumbar support strap to the pet carrier; and placing the pet in the carrier.

In still other embodiments, the hands free pet carrier system according to the present disclosure may additionally include a retractable leash attached on one end to a shock absorbing pad, the shock absorbing pad affixed to a surface of the pet carrier.

In still other embodiments, the hands free pet carrier system according to the present disclosure may additionally include a reusable waterproof liner releasably attachable to an interior bottom portion of the pet carrier.

In still other embodiments, the hands free pet carrier system according to the present disclosure may additionally include a charging pocket adapted to house a portable charger for a mobile device.

In certain embodiments, the charging pocket may be provided on an interior surface of the pet carrier, and the hands free pet carrier system according to the present disclosure may additionally include a charging port provided on a side of the bag and adapted to receive a charging wire threaded from the charging pocket.

In certain other embodiments, the charging pocket may be provided on an exterior surface of the pet carrier.

In certain embodiments the bag may be fabricated from environmentally-friendly material such as recycled material. In some embodiments, the bag may be fabricated from Recycled Polyethylene Terephthalate (RPET) fabric.

DESCRIPTION

Brief Description of the Drawings

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

FIG. 17A is rear perspective view of the pet carrier system showing the seatbelt loop, shoulder strap clips, stabilizing strap, and the lumbar strap for securing the pet carrier system to a vehicle seat. FIGS. 17B and 17C are upper front perspective and rear views, respectively, of the pet carrier system secured to a vehicle seat.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type, for example, "clip" or "strap". However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Figure 1:
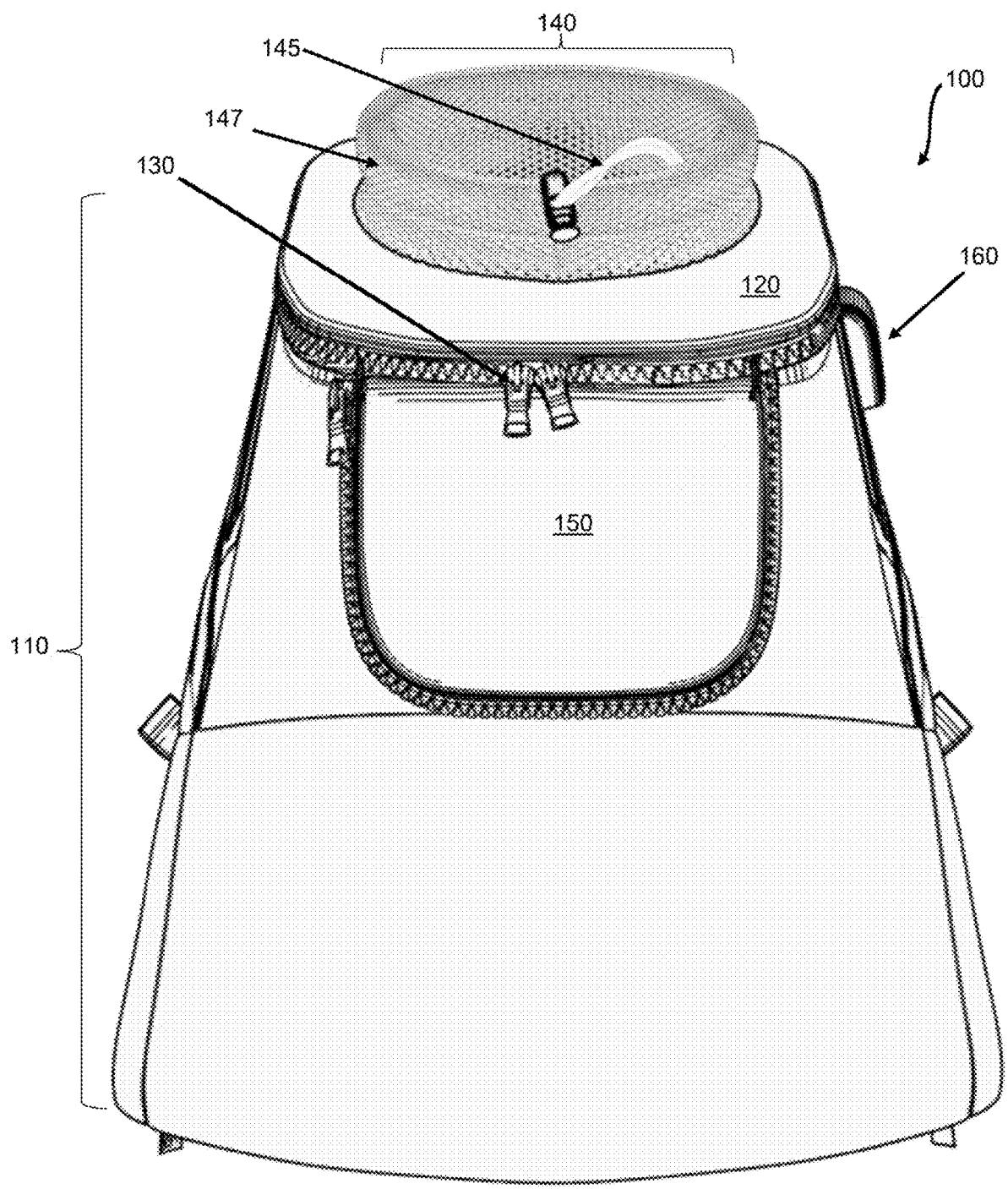
FIG. 1 is a front view of a hands free pet carrier system in accordance with an embodiment of the present disclosure.

Referring to FIG. 1, a hands free pet carrier system 100 includes a bag portion 110 that defines a cavity adapted for receiving a cat, dog, or other small pet or animal. A top cover 120 is removably attachable to the bag 110 by means of a top zipper 130 or other type of fastener. In this embodiment, to facilitate insertion of the pet or animal into the bag 110, a user will remove the top cover 120 by unzipping the zipper 130 and then reattach the top cover 120 once the animal is inside the bag 110. The top cover 120 is provided with an orifice 140 of adjustable diameter. The orifice 140 allows the pet or animal to protrude its head above the top cover and view the surrounding environment and breathe the ambient air. For improved comfort of the animal, a pad 147 that surrounds the orifice may be provided. The diameter of the orifice 140 may be adjusted according to the head and neck size of the pet or animal to create, for example, a snug fit in case of inclement weather or a loose fit that enhances ventilation in case of high outside temperature. Moreover, the diameter may be adjusted to prevent the animal from withdrawing its head to the interior of the bag 110 or to prevent the animal from extending its head above the top cover 120. In the embodiment shown, the diameter of the orifice 140 is adjusted by a sizing cord 145 that encircles the orifice 140, but other embodiments may employ other methods, such as an elastic band. A retractable ventilation port cover 150 covers a ventilation window 210 (see FIG. 2). For user convenience, a charging port 160 provided with a USB or similar connection port is provided so that the user may conveniently recharge a mobile device while using the hands free pet carrier system 100.

The hands free pet carrier system may be constructed from any appropriate materials known in the art. In certain embodiments, the bag portion 110 may be constructed from a polymeric material, including natural and artificial polymers. In certain embodiments the bag portion 110 may be constructed from an environmentally-friendly material such as a recycled polymeric material. In certain embodiments, the bag portion 110 may be constructed from Recycled Polyethylene Terephthalate (RPET). In certain embodiments the hands free pet carrier system 100 is itself recyclable. In certain embodiments the bag portion 110 may be made of fire retardant material or processed to become fire retardant.

Figure 2:
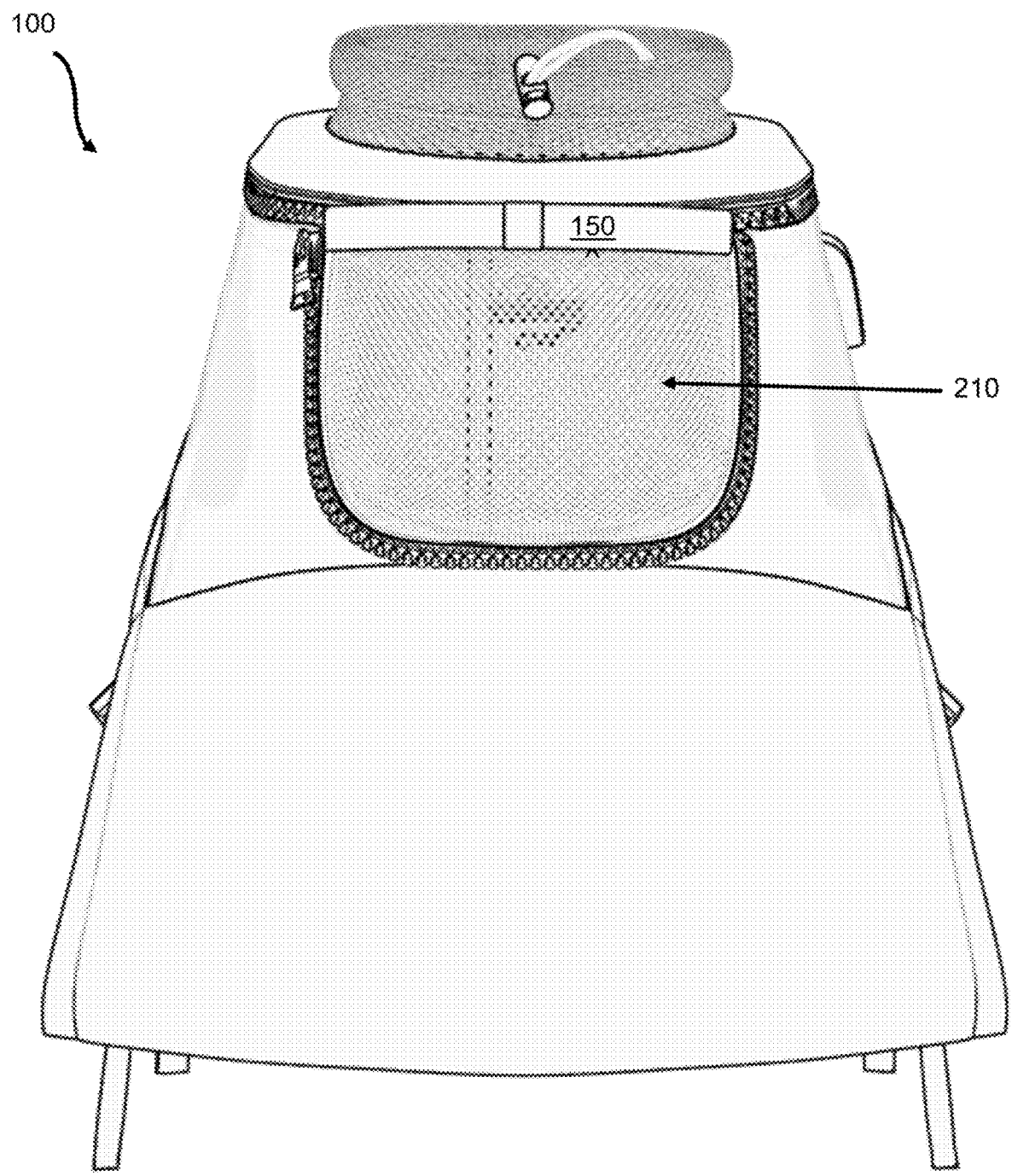
FIG. 2 is a front view of a hands free pet carrier system in accordance with an embodiment of the present disclosure illustrating a window pocket in an open state.

FIG. 2 shows the ventilation port cover 150 in a retracted state, exposing underneath a ventilation window 210, a mesh-like screen through which air may pass. This ventilation window 210 allows ambient air to enter the interior of the carrier 100 and is useful, for example, in warm climates to facilitate the circulation of fresh air to the animal and avoid overheating. The ventilation window 210 may also be used a window for the animal to see out of if it decides to hide itself inside the pet carrier 100.

Figure 3:
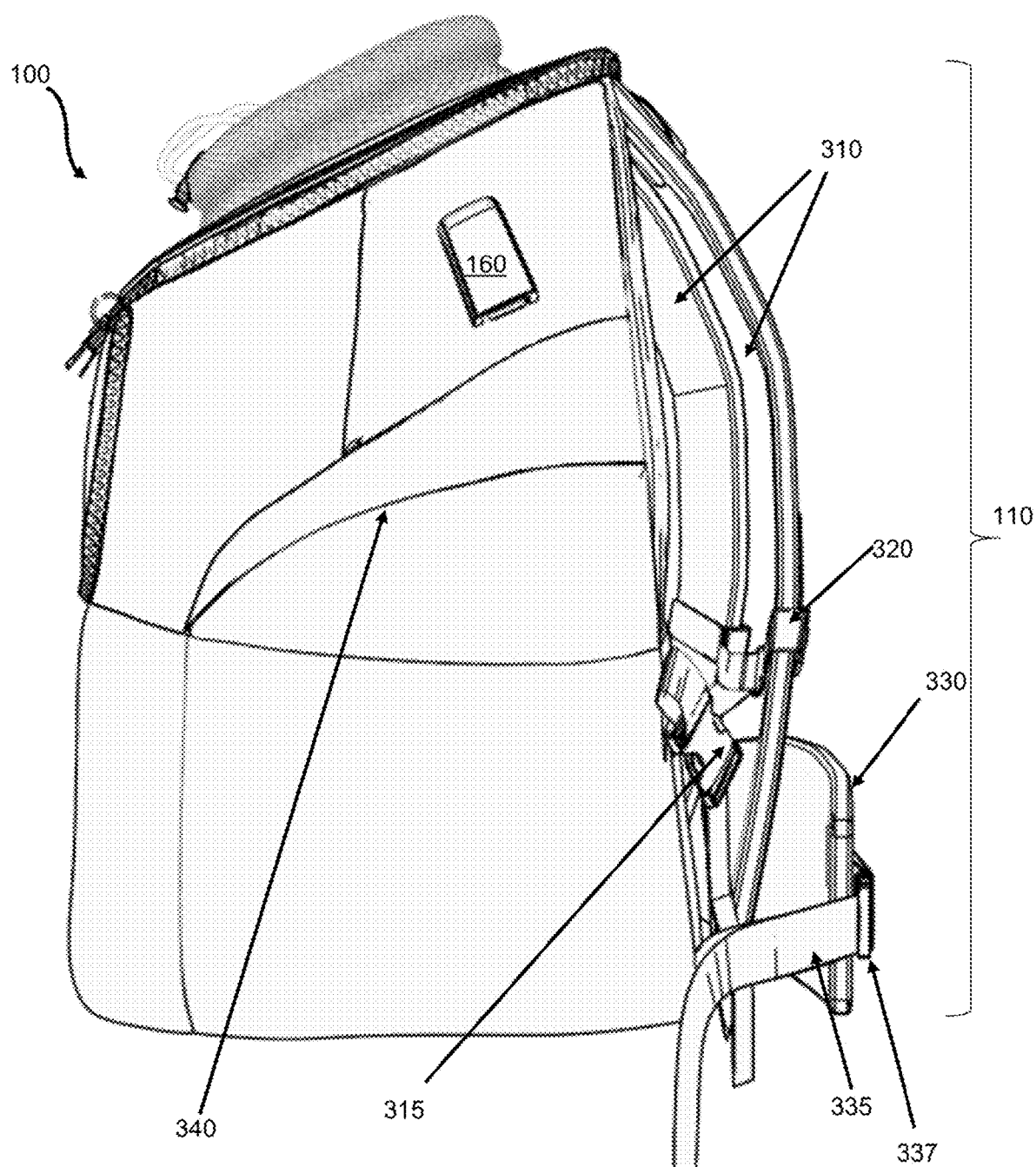
FIG. 3 is a side view of a hands free pet carrier system in accordance with an embodiment of the present disclosure.

As seen in FIG. 3, a side view of an embodiment of the hands free pet carrier system 100, left and right shoulder straps 310 are affixed at one end to the top portion of the bag 110. A shoulder strap fastener (not shown) is provided on a second end of each of the shoulder straps 310. The shoulder strap fasteners connect to corresponding mating fasteners 315 attached to a bottom portion of the bag 110. A stabilizing strap 320 releasably connects the left and right shoulder straps for added stability when worn or when secured to a vehicle seat. A lumbar strap pad 330, adjustable lumbar strap 335, and lumbar fastener 337 are provided to afford additional stability and support when the carrier 100 is worn by a user or attached to a vehicle seat.

An opening for a petting pocket 340 may also be provided on one or more sides of the pet carrier 100. The petting pocket 340 is an orifice through which the user may insert her or his hand or finger(s) and directly touch the animal inside the pet carrier 100 in order to provide comfort and foster bonds of attachment between the animal and its owner.

Figure 4:
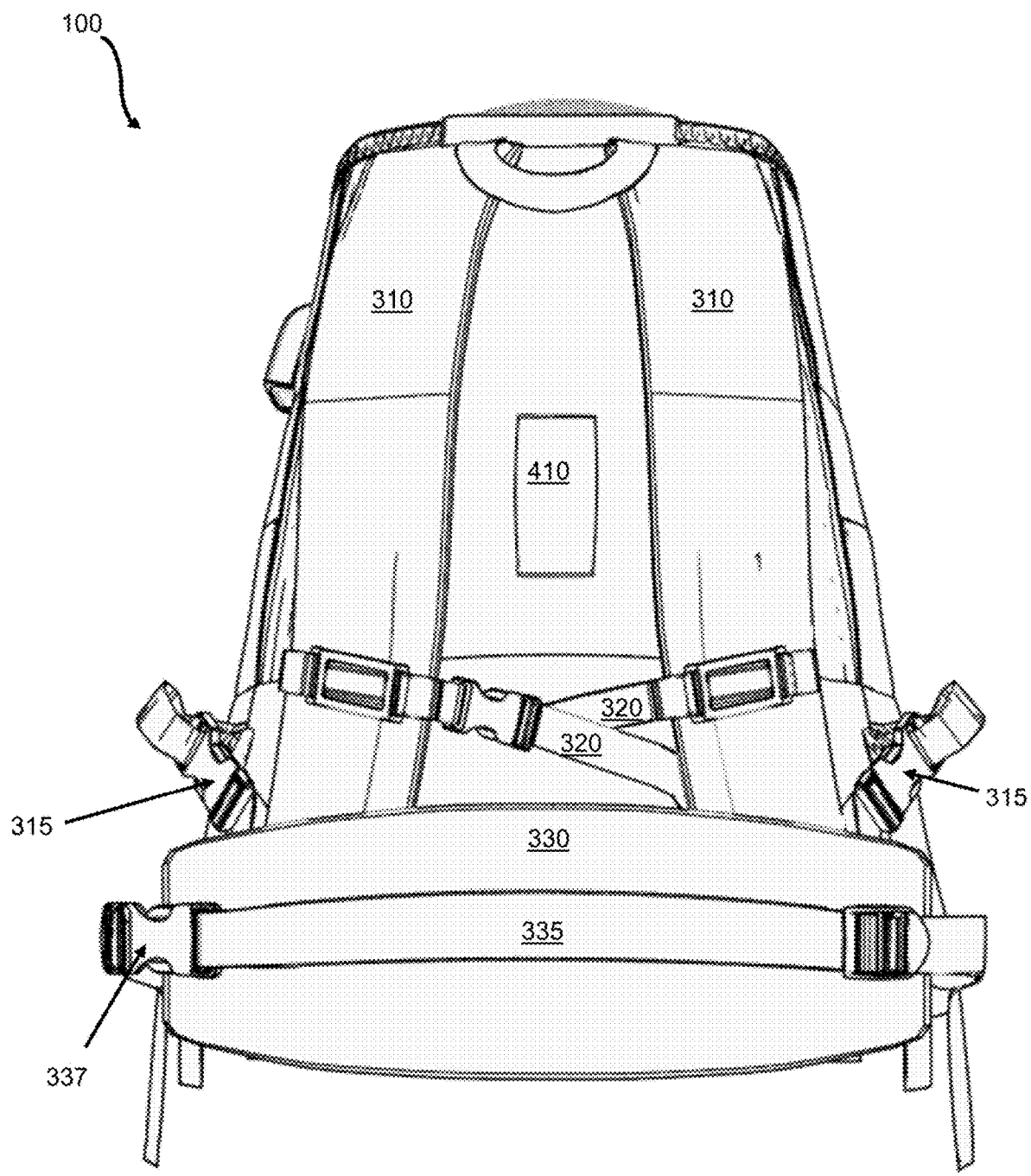
FIG. 4 is a rear view of a hands free pet carrier system in accordance with an embodiment of the present disclosure.

FIG. 4 is a rear view of an embodiment of the hands free pet carrier system 100. This figure shows in greater detail the connection of the stabilizing strap 320 to couple left and right shoulder straps 310. The lumbar strap pad 330 and adjustable lumbar strap 335 enhance stability and comfort when a user wears the pet carrier 100 and increased stability and safety when the pet carrier 100 is secured to a vehicle seat. A seatbelt loop 410 is affixed to the same side of the bag 110 as the shoulder straps 310.

Figure 5:
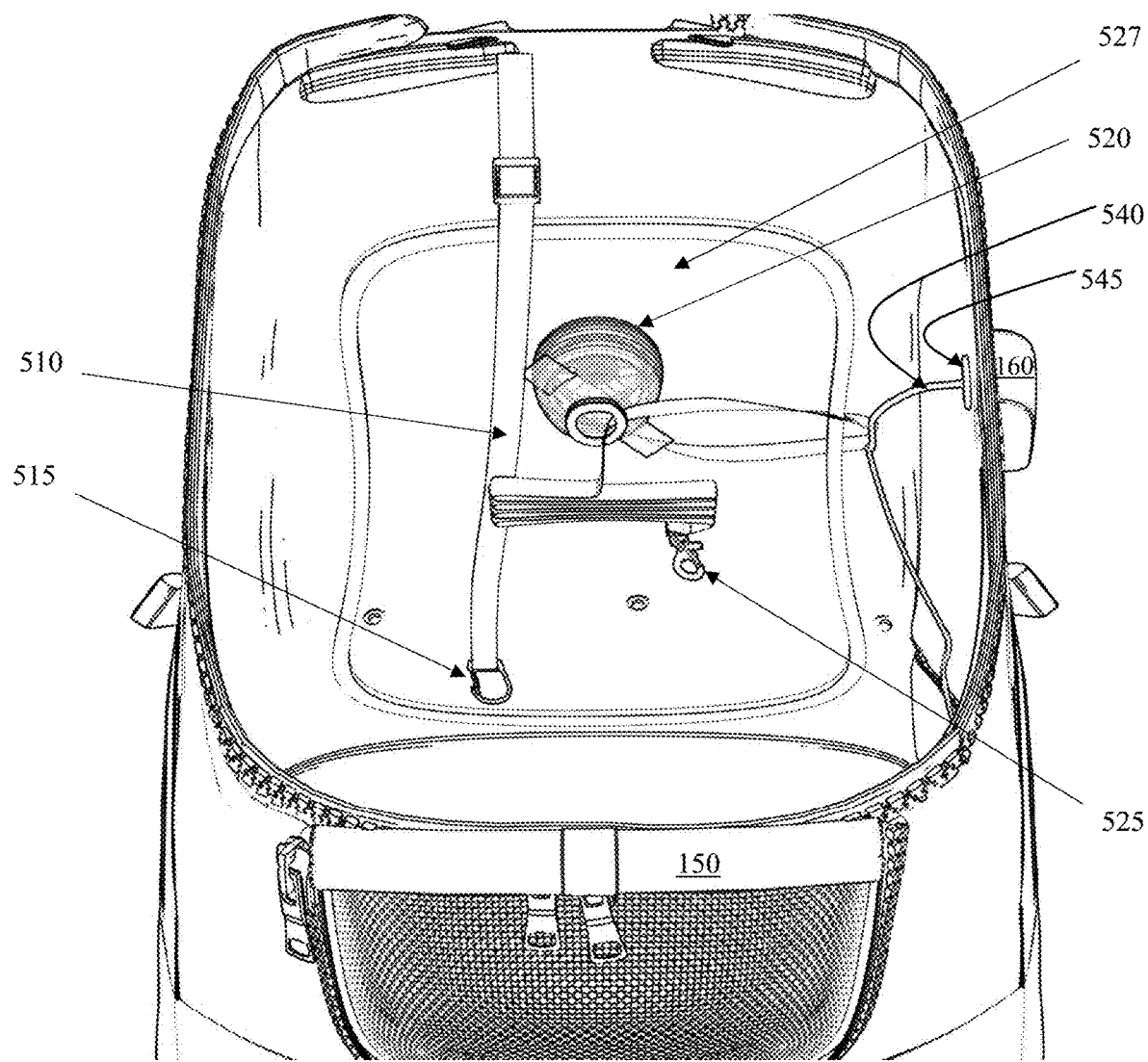
FIG. 5 is top perspective view showing the interior of a hands free pet carrier system in accordance with an embodiment of the present disclosure, with the top portion of the carrier detached or in an open state.

FIG. 5 is an interior view of an embodiment of the hands free pet carrier system 100 with the top cover 120 in an open or detached state. In the interior of the pet carrier 100 a safety leash 510 of adjustable length may be provided to restrain the animal inside the pet carrier 100. In this embodiment, one end of the safety leash 510 is attached to the pet carrier 100 (see FIG. 7) and another end is provided with a clip 515 or fastener to suitable for attachment to pet harnesses and collars.

So that the user may allow the animal to exercise and roam about safely while on a walk, a hands free retractable leash assembly is also provided. The assembly includes a hands free retractable leash 520 that is secured, via a shock absorbing pad 527 (see FIG. 6B), to the interior of the pet carrier 100. A clip 525 or other fastener that suitable for attachment to pet harnesses and collars is provided on the other end of the retractable leash 520. The shock absorbing pad reduces strain and pull on both the animal tethered to the retractable leash 520 and the user wearing the pet carrier 100.

Figure 11:
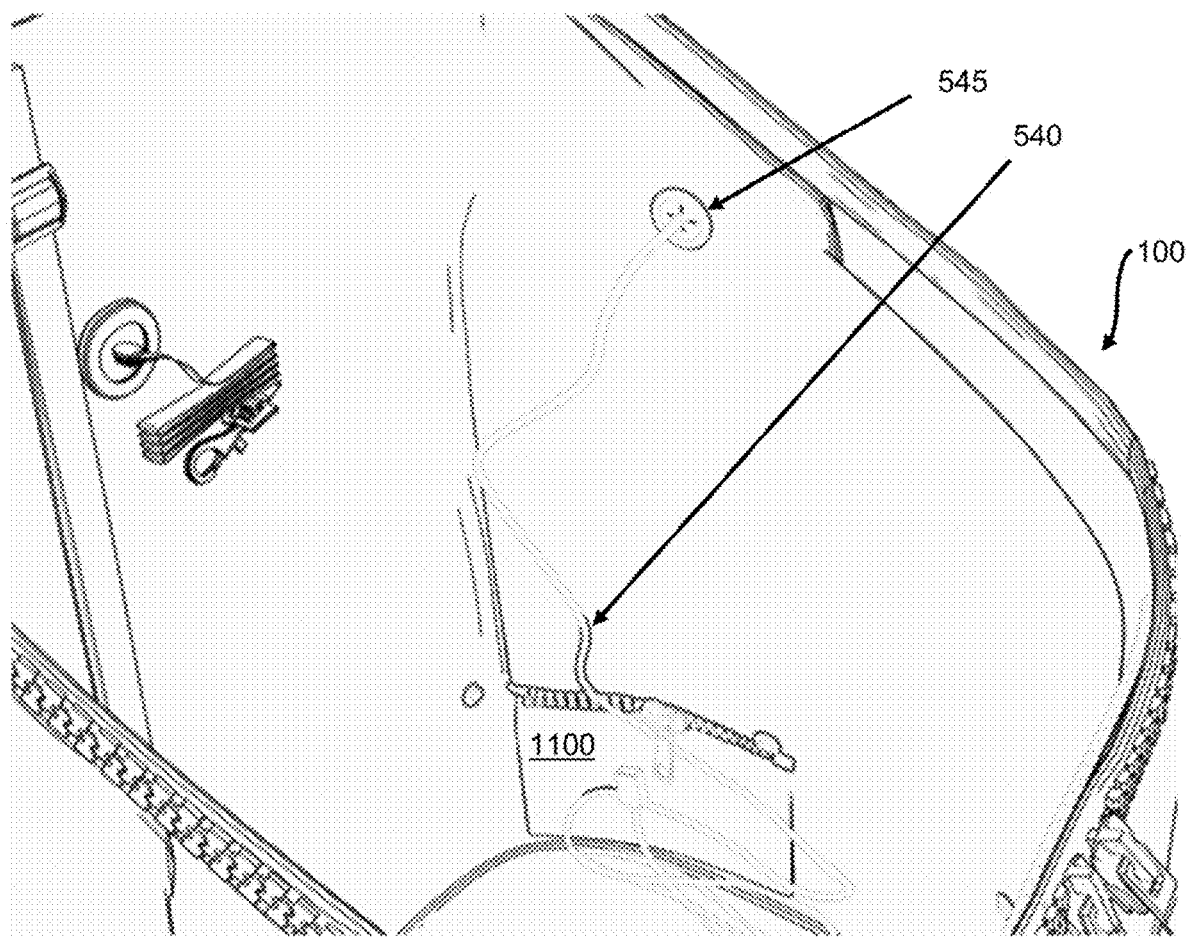
FIG. 11 is a partial interior view showing the safety leash, the hands free retractable leash, a wire for a charging bank and a zippered charging pocket in a hands free pet carrier system in accordance with an embodiment of the present disclosure.

As an added convenience to the user, a charging port for a portable mobile device may be provided in some embodiments. A charging pocket (see FIG. 11) for housing a portable battery charger may be provided. The charging pocket illustrated in FIG. 11 is in the interior of the pet carrier 100, but in alternative embodiments the charging pocket may be provided on the exterior of the pet carrier 100. A charging port wire 540 may be connected on one end to the battery charger housed within the charging pocket in the interior of the pet carrier 100, and another end of the wire 540 may pass through a charging port grommet 545 to the external charging port 160 of the pet carrier 100 for connection to a mobile device of the user.

Figure 6B:
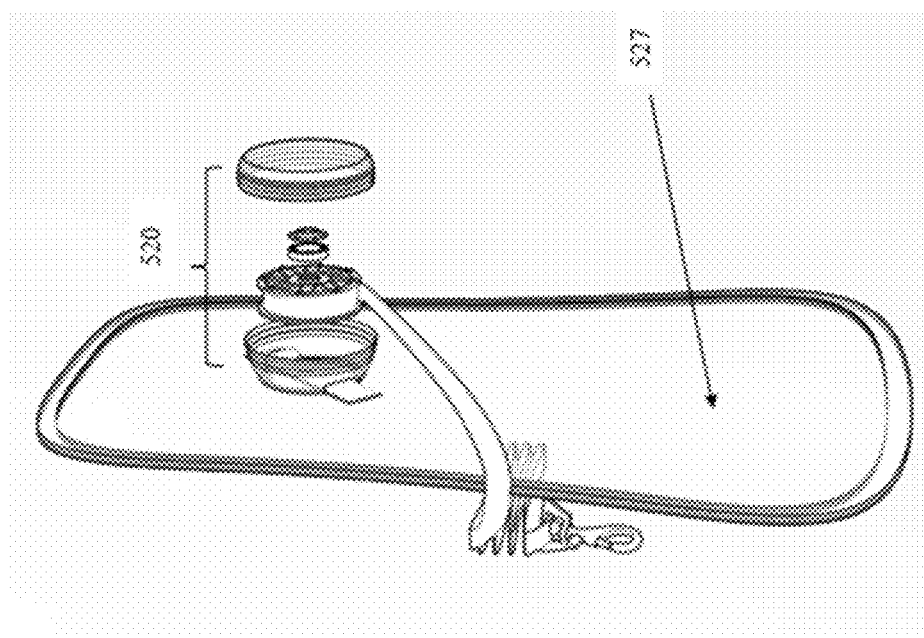
FIG. 6B is a side view of a retractable leash assembly provided in the interior of a hands free pet carrier system in accordance with an embodiment of the present disclosure.
Figure 6A:
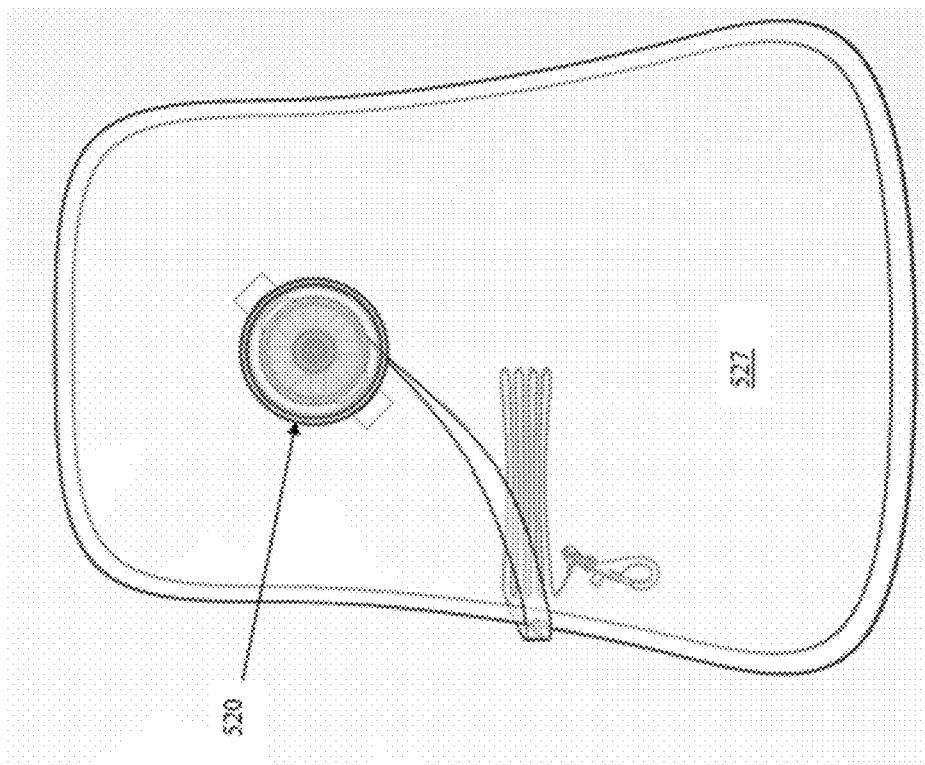
FIG. 6A is a front view of a retractable leash assembly provided in the interior of a hands free pet carrier system in accordance with an embodiment of the present disclosure.

FIGS. 6A and 6B show front and side views of the hands free retractable leash assembly. As can be seen in FIG. 6B, the retractable leash 520 is connected to a shock absorbing pad 527 disposed between an inner surface 610 of the pet carrier 100 and an outer surface 620 of the pet carrier.

Figure 7:
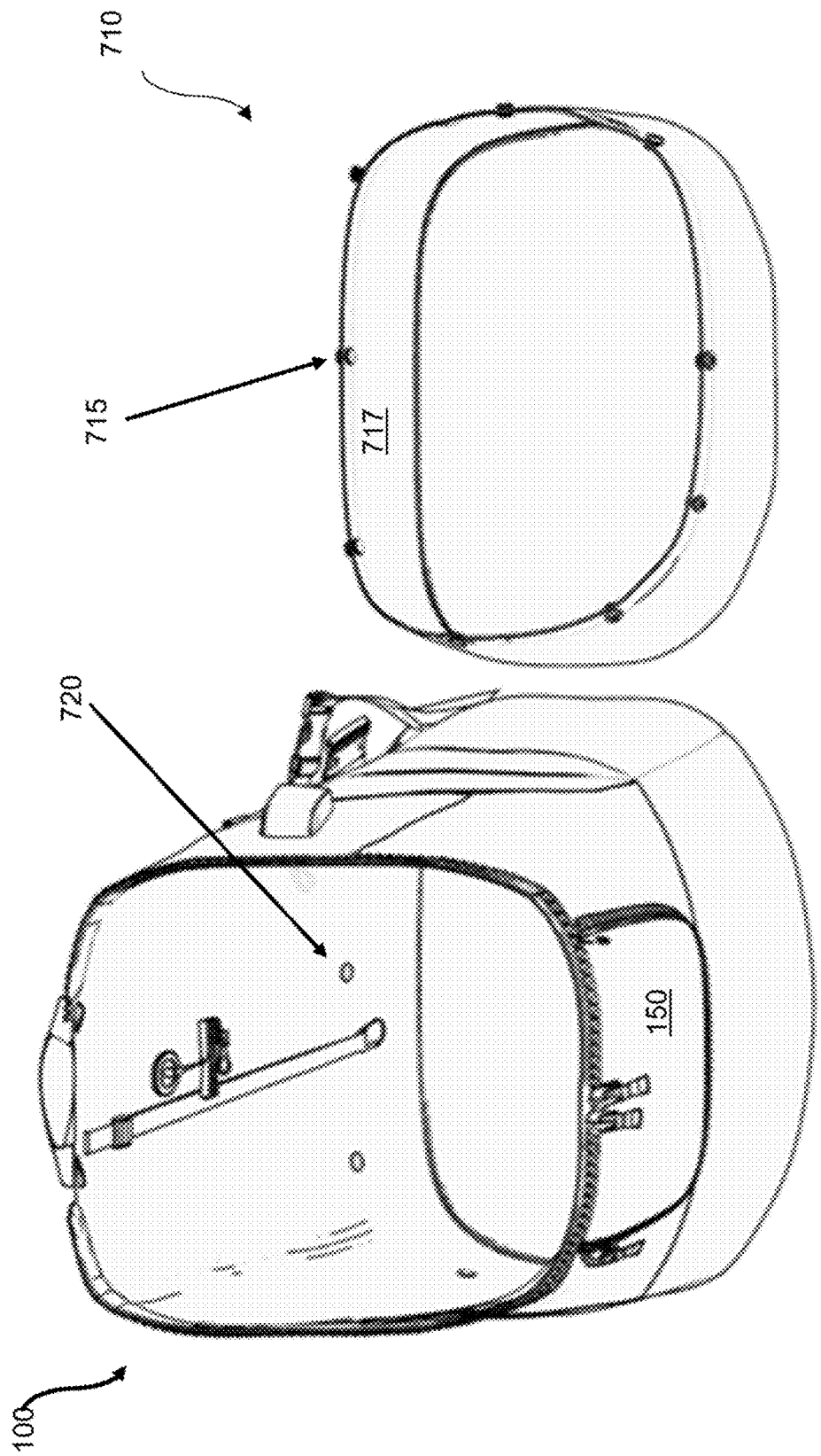
FIG. 7 is a top perspective view of an embodiment of the hands free pet carrier system of FIG. 5 with a reusable waterproof liner detached from the pet carrier.

FIG. 7 shows the hands free pet carrier system 100 without the top cover 120 and with a reusable waterproof liner 710 detached from the pet carrier. The reusable waterproof liner 710 is provided to collect bodily waste from the animal during extended periods of confinement and to prevent leakage of bodily fluids or other liquids from the bottom of the pet carrier. A raised edge 717 of the liner prevents spills. The waterproof liner 710 is preferably made of stain-resistant, machine washable waterproof material. For convenience and to facilitate cleaning, the liner 710 is removably attachable to the pet carrier 100 by means of fasteners 715 on the liner 710 and mating fasteners 720 on the pet carrier. Fasteners 715 and 720 may be any type of fastener, including, but not limited to buttons and button holes, zippers, hook-and-loop fasteners, hook-and-eye fasteners, toggles, ties, grommets, snaps or any combination of these.

In other embodiments, the entire pet carrier system 100 may be made of waterproof and buoyant material. This would be suitable, for example, for a pet owner who takes their pet on canoe trips of the like, where a floatable pet carrier can function as a floatation device or life preserver.

Figure 8:
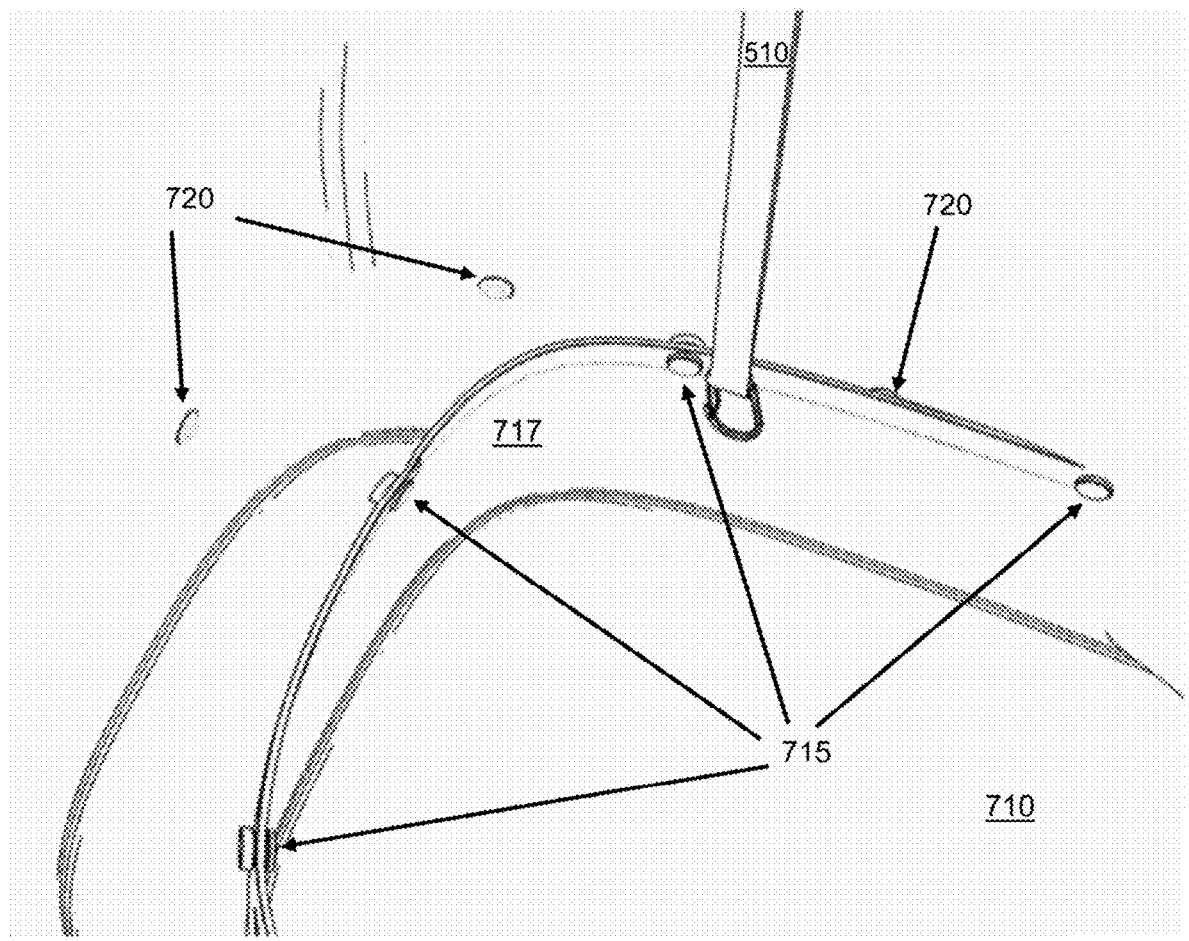
FIG. 8 is a partial interior view showing a safety leash and connectors for connecting the reusable waterproof liner to the pet carrier in a hands free pet carrier system in accordance with an embodiment of the present disclosure.

FIG. 8 shows in greater detail how fasteners 715 and 720 may align inside the pet carrier 100.

Figure 9:
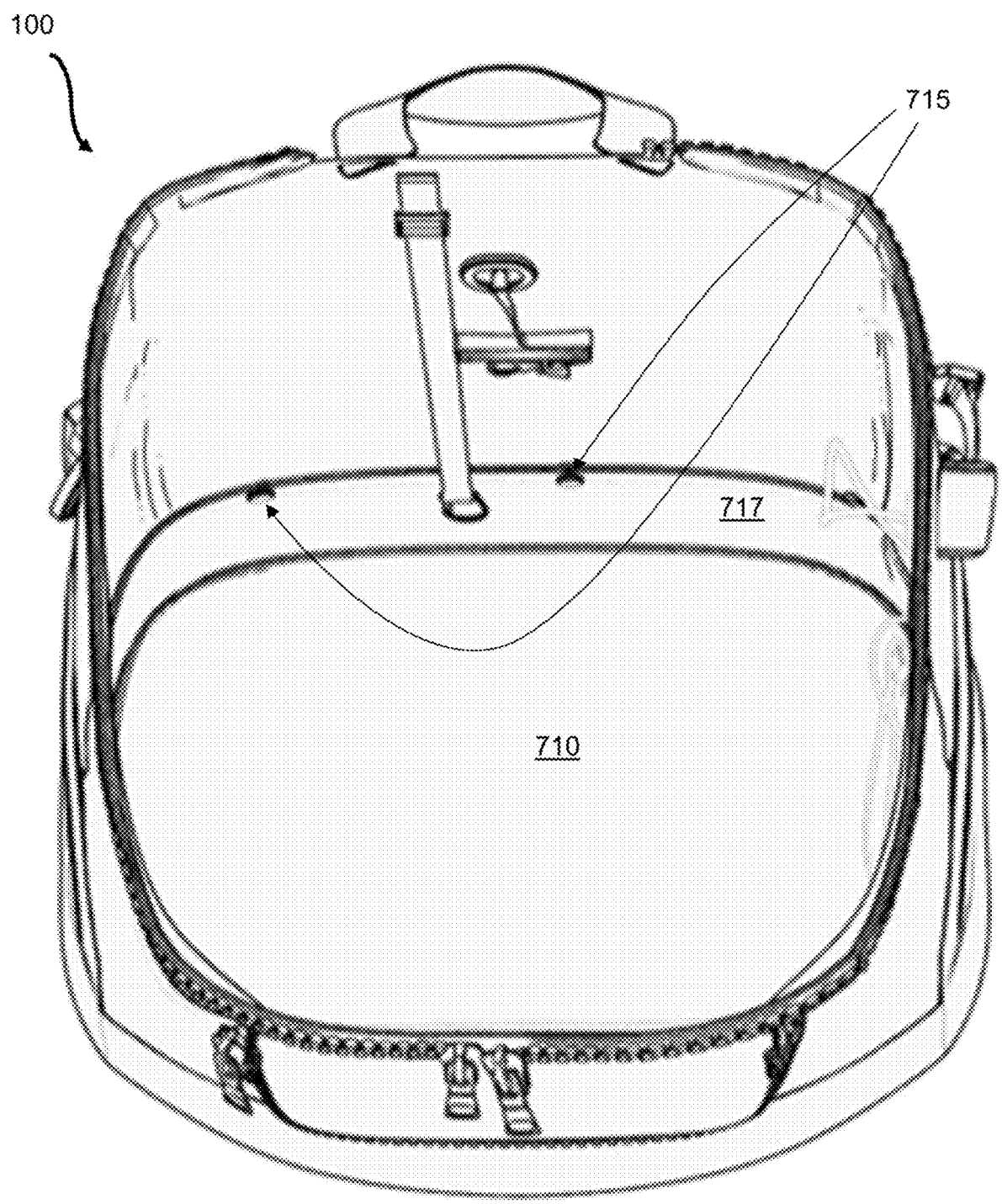
FIG. 9 is a top view showing the interior of a hands free pet carrier system in accordance with an embodiment of the present disclosure, with the top portion of the carrier in an open state.
Figure 10:
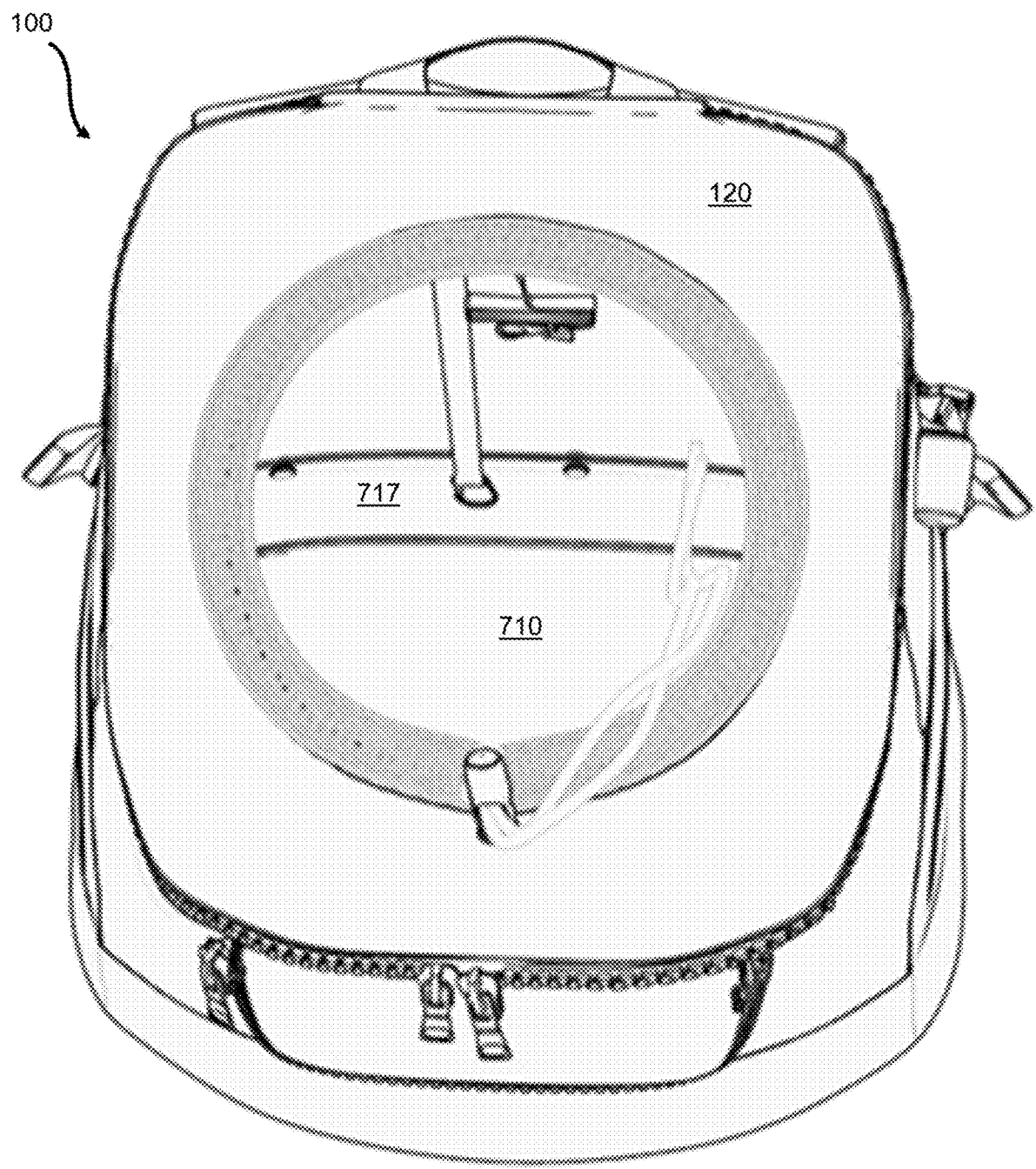
FIG. 10 is top perspective view of a hands free pet carrier system in accordance with an embodiment of the present disclosure, with the top portion of the carrier in a closed state.

As can be seen in FIG. 9, when installed inside the pet carrier 100 and attached via fasteners 715 and 720, the reusable waterproof liner 710 and its raised edge 717 fit snuggly against the surfaces of the pet carrier 100 to prevent leakage of fluids. FIG. 10 shows an additional view of the pet carrier 100 with reusable waterproof liner 710 installed.

In this configuration, the top cover 120 is attached to the pet carrier 100 and in a closed state.

When hiking or walking through remote terrain with a pet, for example, a user may depend on her/his mobile device for communication and/or navigational guidance and thus a reliable source of power is vital. As described above, in some embodiments, a charging pocket for housing a portable battery charger may be provided as convenience to user. FIG. 11 shows a charging pocket 1100 disposed on an interior surface of the pet carrier 100. The charging port wire 540 connects a charging source housed within the charging pocket 1100 through the grommet 545 to the external charging port 160 (see FIG. 5) to which the user may connect her or his mobile device. In alternative embodiments, the charging pocket 1100 may be provided on an exterior surface of the pet carrier 100 and allow for direct connection to a user's mobile device without the need for the charging port grommet 545 and the charging port 160.

Figure 12:
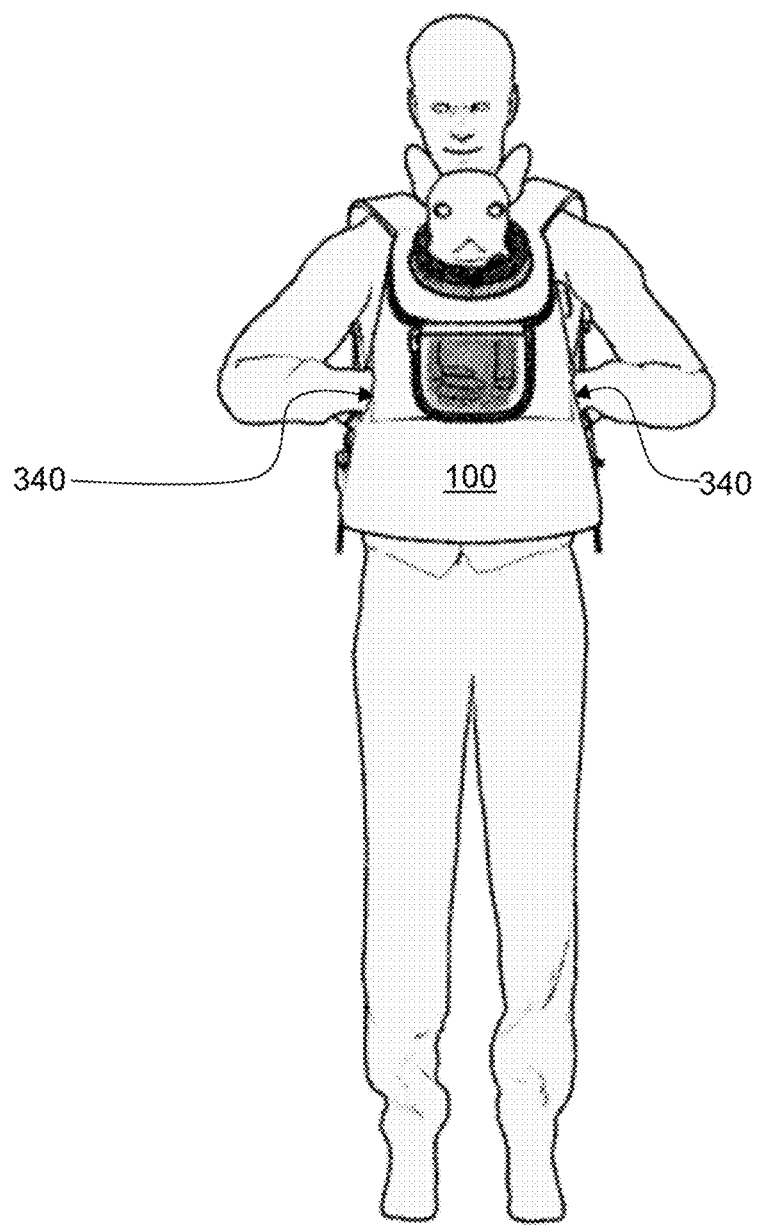
FIG. 12 is a front view of a user carrying a pet in a hands free pet carrier system in accordance with an embodiment of the present disclosure, with the user's hands touching the pet through petting pockets.
Figure 13:
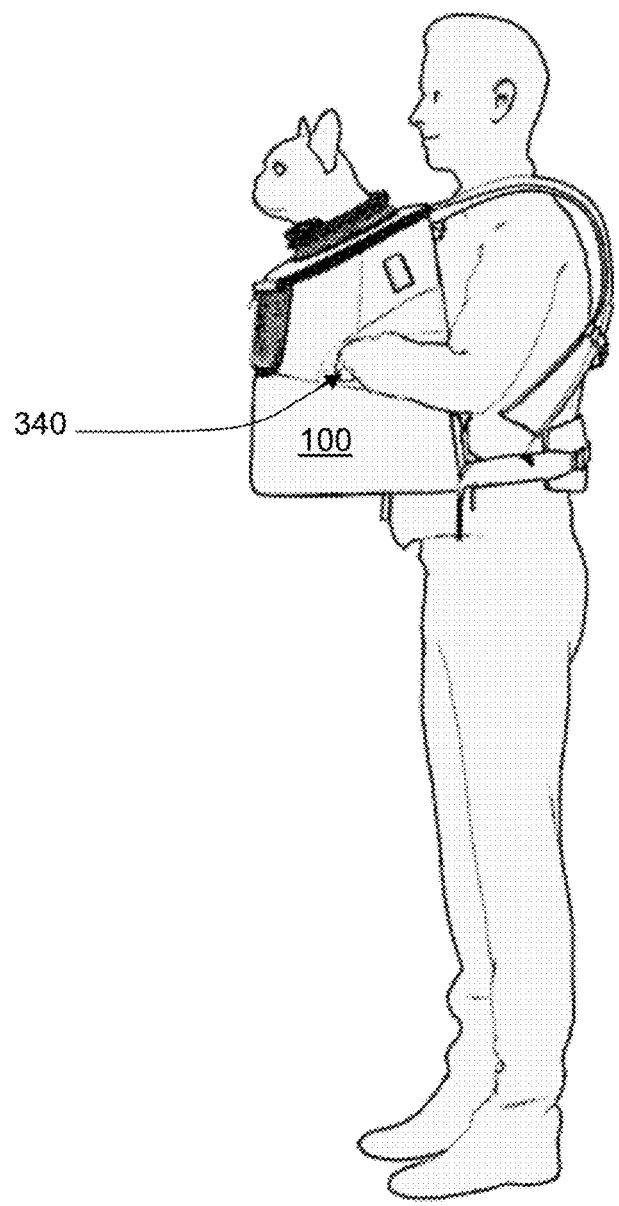
FIG. 13 is a side view of a user carrying a pet in a hands free pet carrier system in accordance with an embodiment of the present disclosure, with the user's hands touching the pet through petting pockets, and showing a smart device charging port.
Figure 14:
FIG. 14 is a front view of a user walking a pet attached via a retractable leash in a hands free pet carrier system in accordance with an embodiment of the present disclosure.
Figure 15:
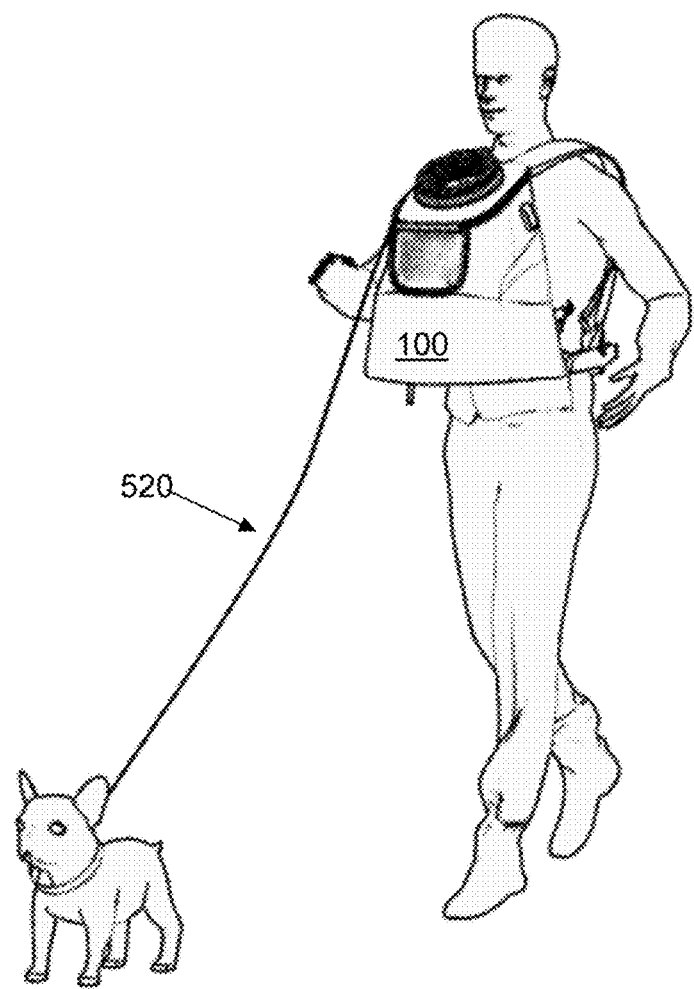
FIG. 15 is a front perspective view of a user walking a pet attached via a retractable leash in a hands free pet carrier system in accordance with an embodiment of the present disclosure.
Figure 16:
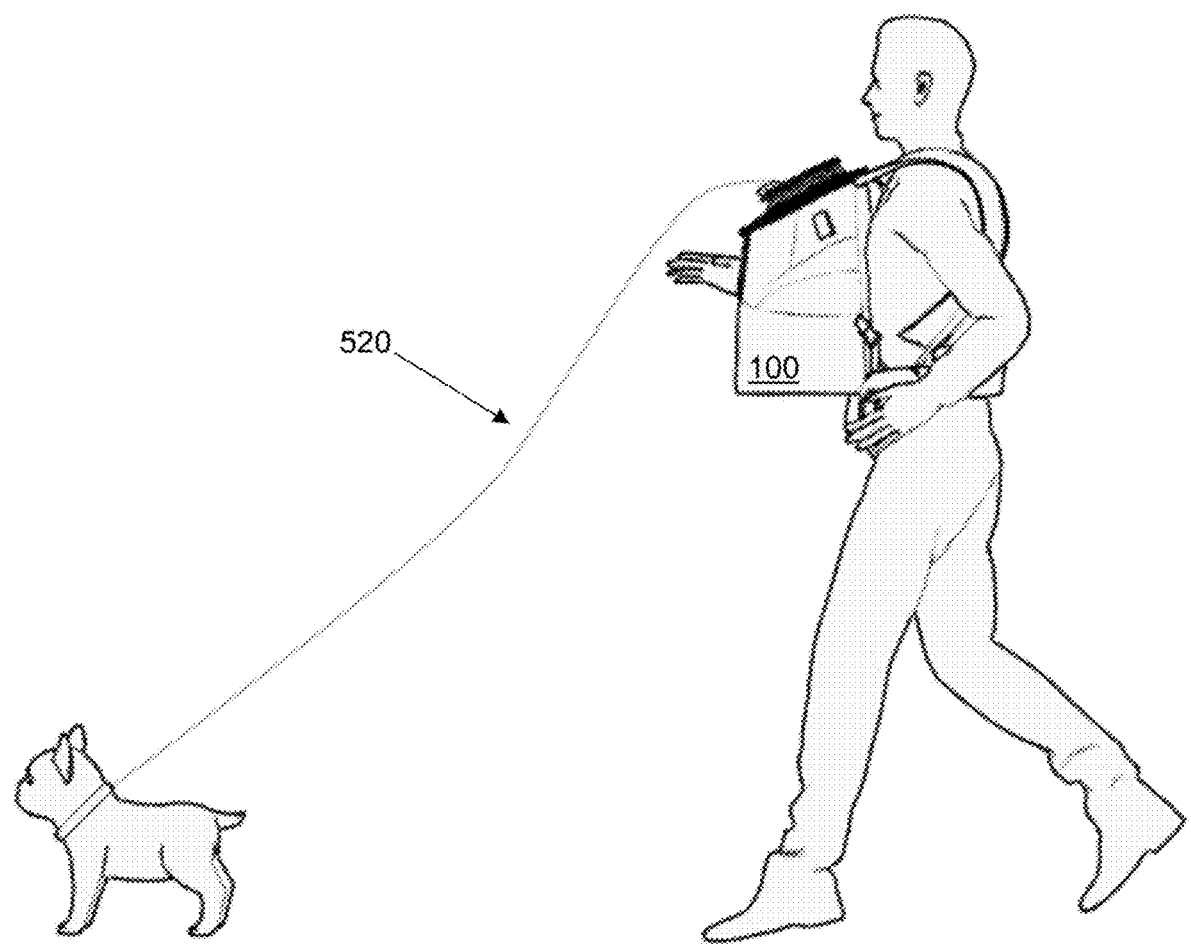
FIG. 16 is a side view of a user walking a pet attached via a retractable leash in a hands free pet carrier system in accordance with an embodiment of the present disclosure.

FIGS. 12-16 show various examples of the pet carrier 100 in use. FIGS. 12-13 demonstrate the use of the petting pockets 340. The user has inserted his/her hands through the petting pockets 340 and is able to touch, rub, and pet the animal. FIGS. 14-16 show the hands free operation of the pet carrier 100 and the retractable leash 520. Hands free operation affords the user the ability to use their hands for other purposes, such as, for example, to hold a drink, operate a mobile device, refer to a map, etc.

The hands free pet carrier system 100 of this disclosure is not limited to being worn on the front of the user, and in some embodiments the user may wear the carrier on the back of his or her body, similar to a backpack.

Figure 17A:
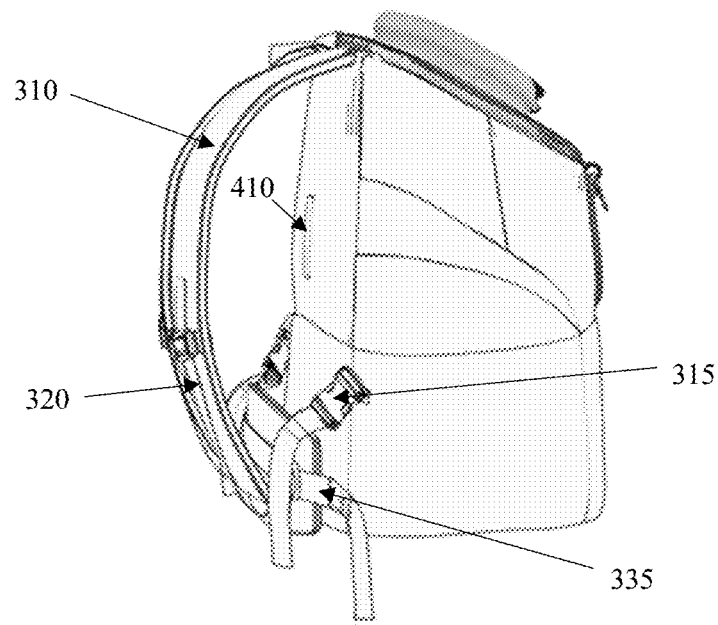
FIGS. 17A-C show the vehicle seat attachment system. Specifically.
Figure 17B:
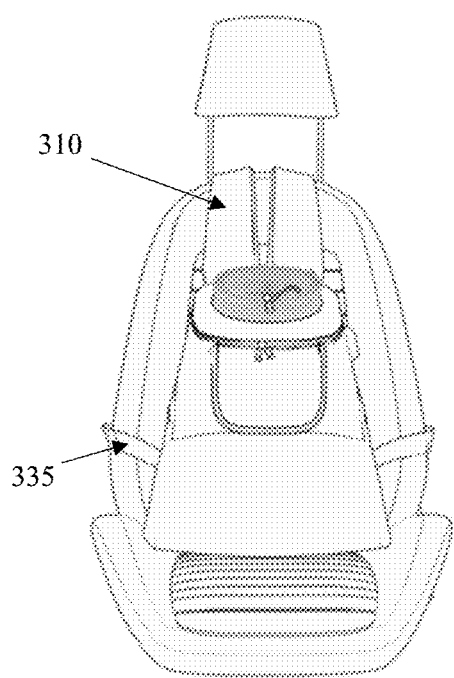
Figure 17C:
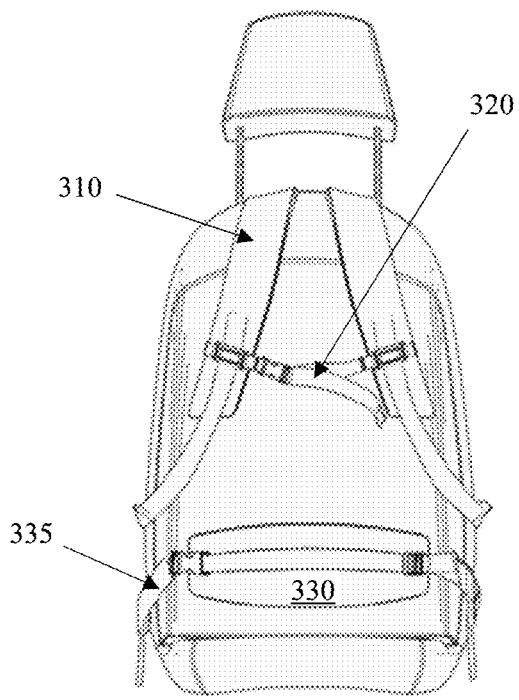

The pet carrier system 100 may also be installed in a vehicle as a vehicle restraint system for a pet. FIG. 17A shows the seatbelt loop 410 adapted to accommodate a seatbelt that is threaded therethrough, the shoulder strap clips 315 that disengage to allow threading of the straps through a neck rest assembly in a vehicle, the stabilizing strap 320 that adds stability to the shoulder straps, and the lumbar strap 330 adaptable to wrap around a vehicle seat to secure the pet carrier system 100 to a vehicle seat, FIGS. 17B and 17C show the pet carrier system 100 secured to a vehicle seat at (1) an upper securing location via the shoulder straps 310 threaded through the neck rest assembly in the vehicle and further stabilized via the stabilizing strap 320 and (2) at a lower securing location via the lumbar strap 330 wrapped around and fastened at the rear of the vehicle seat.

To securely attach the pet carrier system 100 to a vehicle seat, the user performs the following steps as outlined below. First, the user unfastens the lumbar support fastener 337 and the shoulder strap fasteners 315. The stabilizing strap 320 may remain in its fastened state, coupling left and right shoulder straps 320 together. Alternatively, the stabilizing strap 320 may be unfastened at this time and then re-fastened later after the shoulder straps 310 have been reattached to the corresponding fasteners 315. Next, the user threads the latch plate end of a seatbelt through the seatbelt loop 410, inserts the seatbelt latch plate into a mating seatbelt buckle receptacle, and adjusts the seatbelt length to remove slack. Then, the user guides the unfastened ends of the shoulder straps 310 in-between left and right posts of a headrest at the top of the vehicle seat. The user pulls the shoulder straps 310 through the headrest posts to the rear of the vehicle seat and re-fastens each shoulder strap 310 to the corresponding shoulder strap fastener 315. The user then guides the lumbar support pad and strap around the back and sides of the vehicle seat and re-fastens the lumbar strap via fastener 337 and adjusts the strap length to hold the pet carrier 100 securely in place against the vehicle seat.

In an alternative embodiment, the hands free pet carrier system according to the present disclosure may additionally include removable non-seatbelt fastening straps for securing the pet carrier system in a vehicle. Any number of straps may be included wherein at least one strap attaches engages with an exterior region of the carrier system on its back and/or near its bottom and a further strap engages with an exterior region of the carrier system near its top. The straps may be used to attach to two lower anchors on or near the vehicle seat and one top anchor above or behind the vehicle seat. Such anchors are mandated in vehicles in various jurisdictions, including in the United States, and may be utilized whenever present in a vehicle. Mechanisms and methods for attachment to such anchors are well-known, such as for child safety restraints and car seats, and any appropriate mechanisms are contemplated, including feeding a strap through the anchor, using a specific or general latch or connector, etc.

In alternative embodiments, the hands free pet carrier system according to the present disclosure may be attached similarly to a kitchen or dining room chair when at home or outside the home.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Advances in science and technology may make equivalents and substitutions possible that are not now contemplated by reason of the imprecision of language; these variations should be covered by the appended claims. This written description uses examples to disclose the method, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A hands free pet carrier and in-vehicle restraint system comprising:
    a bag defining a cavity therein configured for receiving a pet;
    a top cover releasably attachable to the bag and having a substantially circular orifice of diameter sufficient to accommodate a protruding head of the pet;
    a padded collar surrounding said orifice, wherein the padded collar is adjustable to vary the diameter of said orifice;
    a left shoulder strap and a right shoulder strap, each shoulder strap having a first end attached to an upper portion of the bag and a second end adjustably and releasably attachable to a lower portion of the bag;
    a stabilizing strap that releasably connects both shoulder straps at a mid-point thereof;
    an adjustable lumbar support strap releasably attachable on a lower portion of the bag;
    a first petting pocket provided on a side of the bag, the petting pocket having a closeable orifice through which a user may insert a hand or finger and directly touch the pet within the bag;
    a safety leash having a first end attached directly to an interior surface of the bag cavity and a second end provided with a fastener configured to attach to a collar or harness worn by the pet; and an in-vehicle restraint system configured to secure the carrier to a vehicle seat at five points of restraint, wherein:

the lumbar support strap is adapted to secure a lower portion of the pet carrier to the vehicle seat at lower left-side and right-side securing positions;

the left and the right shoulder straps are adapted to secure an upper portion of the pet carrier to the vehicle seat at upper left-side and right-side securing positions; and a looped strap provided on a rear surface side of the pet carrier is adapted to accommodate a seatbelt and secure the pet carrier to the vehicle seat at an elevation substantially between the upper and lower securing positions, each of the lumbar support strap, the left shoulder strap, and the right shoulder strap is formed from a material having a tensile strength at least substantially the same as Recycled Polyethylene Terephthalate fabric.

2. The hands free pet carrier and in-vehicle restraint system of claim 1, wherein the second end of each shoulder strap comprises a fastener that releasably attaches with the lower portion of the bag.

3. The hands free pet carrier and in-vehicle restraint system of claim 2, wherein the fastener of each shoulder strap releasably attaches to a corresponding mating fastener attached at the lower portion of the bag.

4. The hands free pet carrier and in-vehicle restraint system of claim 1, further comprising:

a second petting pocket disposed on an opposite side of the bag from the first petting pocket.

5. The hands free pet carrier and in-vehicle restraint system of claim 4, wherein each petting pocket is configured as a slit allowing for substantially horizontal, unimpeded, direct access by a hand or finger of a user to a pet therein.

6. The hands free pet carrier and in-vehicle restraint system of claim 1, further comprising:

a ventilation window provided on the bag at a side opposite the shoulder straps, the ventilation window configured to permit air to flow therethrough and is provided with a releasably attachable cover.

7. The hands free pet cattier and in-vehicle restraint system of claim 1, wherein the bag is made of a recycled material.

8. The hands free pet carrier and in-vehicle restraint system of claim 7, wherein the recycled material is Recycled Polyethylene Terephthalate (RPET).

9. The hands free pet carrier and in-vehicle restraint system of claim 1, further comprising:

a hands free automatically retractable leash, wherein the hands free automatically retractable leash is attached at only a single attachment site via a shock absorbing pad to an interior surface of the pet carrier.

10. The hands free pet carrier and in-vehicle restraint system of claim 9, further comprising:

a reusable waterproof liner releasably attachable to an interior bottom portion of the pet carrier.

11. The hands free pet carrier and in-vehicle restraint system of claim 10, further comprising:

a charging pocket adapted to house a portable charger for a mobile device.

12. The hands free pet carrier and in-vehicle restraint system of claim 11, wherein the charging pocket is provided on an interior surface of the pet carrier, the pet carrier further comprising:

a charging port provided on an exterior side of the bag and adapted to receive a charging wire threaded from the charging pocket to the charging port.

13. The hands free pet carrier and in-vehicle restraint system of claim 11, wherein the charging pocket is provided on an exterior surface of the pet carrier.

14. A method for installing a pet carrier in a vehicle seat as an in-vehicle restraint system for a pet, the method comprising:

providing the pet carrier, the pet carrier comprising:

a bag defining a cavity therein configured for receiving a pet;

a top cover releasably attachable to the bag and having a substantially circular orifice of diameter sufficient to accommodate a protruding head of the pet;

a padded collar surrounding said orifice, wherein the padded collar is adjustable to vary the diameter of said orifice;

a left shoulder strap and a right shoulder strap, each shoulder strap having a first end attached to an upper portion of the bag and a second end adjustably and releasably attachable to a lower portion of the bag;

a stabilizing strap that releasably connects both shoulder straps at a mid-point thereof;

an adjustable lumbar support strap releasably attachable on a lower portion of the bag;

a first petting pocket provided on a side of the bag, the petting pocket having a closeable orifice through which a user may insert a hand or finger and directly touch the pet within the bag; and a safety leash having a first end attached directly to an interior surface of the bag cavity and a second end provided with a fastener configured to attach to a collar or harness worn by the pet;

each of the lumbar support strap, the left shoulder strap, and the right shoulder strap is formed from a material having a tensile strength at least substantially the same as Recycled Polyethylene Terephthalate fabric;

placing the pet carrier on a front side of the vehicle seat;

threading one end of a seatbelt of the vehicle through a loop secured to a rear side of the pet carrier;

latching said end of the seatbelt to a seatbelt receptacle of the vehicle adapted to receive said end;

threading the left and the right shoulder straps of the pet carrier, each unfastened on one end from the pet carrier, through a headrest assembly attached to the vehicle seat so that the shoulder straps extend to a rear side of the vehicle seat;

fastening the left and the right shoulder straps from the rear of the vehicle seat to the pet carrier; and wrapping the lumbar support strap around the rear and sides of the vehicle seat and connecting said lumbar support strap to the pet carrier.

15. The method of claim 14, wherein the fastening of the left and the right shoulder straps from the rear of the vehicle seat to the pet carrier is accomplished via fasteners attached to the shoulder straps and corresponding mating fasteners secured to the pet carrier.

16. The method of claim 14 performed while the pet is in the pet carrier.

17. The method of claim 14 further comprising a final step of placing the pet in the pet carrier.

18. A hands free pet carrier and in-vehicle restraint system, the hands free pet carrier comprising:

a bag defining a cavity therein configured for receiving a pet;

a top cover releasably attachable to the bag and having a substantially circular orifice of diameter sufficient to accommodate a protruding head of the pet;
a left shoulder strap and a right shoulder strap, each shoulder strap having a first end releasably attachable attached to an upper portion of the bag and a second end adjustably and releasably attachable to a lower portion of the bag;
a stabilizing strap that releasably connects both shoulder straps at a mid-point thereof;
an adjustable lumbar support strap releasably attachable on a lower portion of the bag;
one or more petting pockets provided on at least one side of the bag, each petting pocket having a closeable orifice through which a user may insert a hand or finger and directly touch the pet within the bag; and
a safety leash having a first end attached directly to an interior surface of the bag cavity and a second end provided with a fastener configured to attach to a collar or harness worn by the pet; and
the in-vehicle restraint system comprising:
a seatbelt loop provided at a position substantially intermediate of a top edge and a bottom edge of a rear side of the bag,
wherein the seatbelt loop has a diameter sufficient to receive a vehicle seatbelt threaded therethrough to secure the pet carrier to a vehicle seat at an intermediate securing position,
wherein the shoulder straps have a length sufficient to be passable through a headrest assembly of the vehicle seat and secured therebehind with the stabilizing strap to secure the pet carrier to the vehicle seat at an upper securing position, and wherein the lumbar support strap has a length sufficient to be wrapped around the vehicle seat to secure the pet carrier to the vehicle seat at a lower securing position; and
each of the lumbar support strap, the left shoulder strap, and the right shoulder strap is formed from a material having a tensile strength at least substantially the same as Recycled Polyethylene Terephthalate fabric.

* * * * *